June 8, 1937.   V. F. FLANDERA   2,083,328
EARTH DIGGING TOOL
Filed Sept. 21, 1936   2 Sheets-Sheet 1
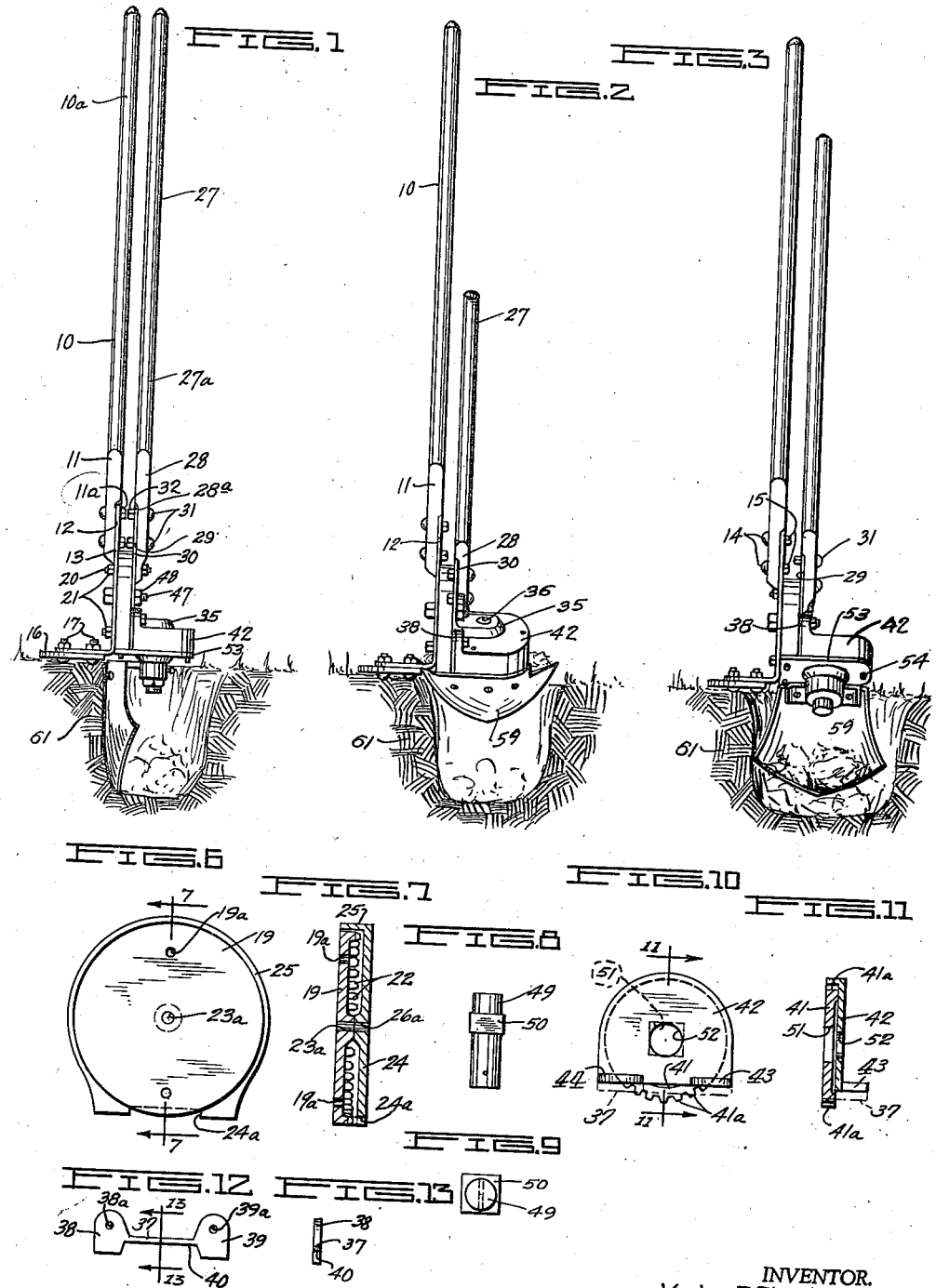
INVENTOR.
Vaclav F. Flandera
BY
ATTORNEY.

June 8, 1937. V. F. FLANDERA 2,083,328
EARTH DIGGING TOOL
Filed Sept. 21, 1936 2 Sheets-Sheet 2
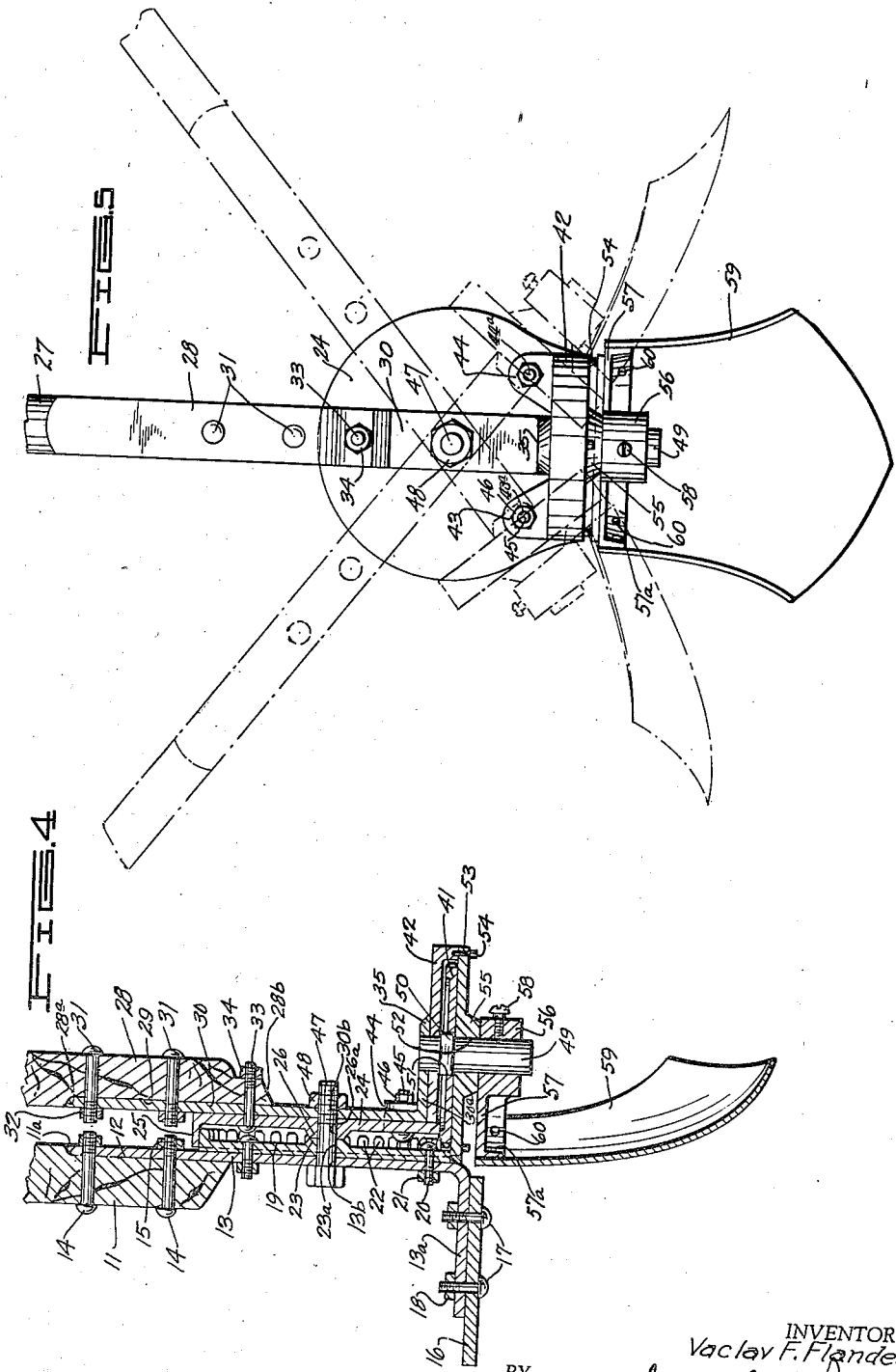
INVENTOR.
Vaclav F. Flandera.
BY
ATTORNEY.

Patented June 8, 1937

2,083,328

UNITED STATES PATENT OFFICE 2,083,328

EARTH DIGGING TOOL

Vaclav F. Flandera, Cleveland, Ohio

Application September 21, 1936, Serial No. 101,697

6 Claims. (Cl. 294—53)

My invention relates to earth digging tools and in particular to a gear operated spade of a new and different type which will, when properly operated, enter, loosen and lift out or turn over the loose soil within the trench thus formed with but little effort, the spade being removed only for the downward thrust each time.

The gear operated spade revolves and lifts the soil by the operation of a pivoting handle, a stationary vertical handle being held in an upright position by the pressure of the foot on a pressure plate attached to the vertical handle.

One object of the device is to provide a means whereby the drudgery of manual lifting and turning of the soil may be eliminated and the same work done easily and with a minimum of effort.

Another object is to provide a device to which may be attached spades or blades of any shape or size, the spades or blades being interchangeable on the job within a few moments.

These and other objects may be noted from the following specification and its accompanying illustrations, in which:—

Fig. 1 is a side elevation of the device just after it is thrust into the soil.

Fig. 2 is a similar view but with the spade in rotated, elevated position, the pivoting handle being drawn forward to lift the soil.

Fig. 3 is a similar view but with the spade rising from the trench in the reverse position to Fig. 2, the pivoted handle being thrust in the opposite direction to that in Fig. 2.

Fig. 4 is an enlarged sectional view of the device, but having a spoon type spade attached slightly different from the type shown in Fig. 1.

Fig. 5 is an enlarged front elevation, with the handles broken away, showing the pivoting of the handles and the revolving and lifting of the spade.

Fig. 6 is a rear elevation of the stationary cog or gear wheel and its cover.

Fig. 7 is a section on line 7—7 of Fig. 6.

Fig. 8 is an elevation of a pivot pin for the revolving spade or blade.

Fig. 9 is an end view of Fig. 8.

Fig. 10 is a top plan view of a revolving cog or gear wheel and its cover.

Fig. 11 is a section on line 11—11 of Fig. 10.

Fig. 12 is a front elevation of a shim.

Fig. 13 is a section on line 13—13 of Fig. 12.

Referring again to the drawings;—a relatively fixed or stationary vertical handle 10 has a rounded top portion 10a and a four-square lower end 11, said end being shouldered at 11a to a flat surface 12 on its forward face, an angular plate 13 being secured thereto by bolts 14 and nuts 15. A foot pressure plate 16 is secured to the bottom of the flange 13a of the angular plate 13 by bolts 17 and nuts 18.

A stationary cog wheel or gear 19 is secured to the face of the angular plate 13 by bolts 20 through apertures 19a in the cog wheel 19 and retained thereon by nuts 21, said cog or gear wheel having a series of teeth 22 projecting forwardly therefrom around the outer periphery thereof; a boss 23 in the center of said cog wheel has a bore 23a therethrough.

A casing 24 of such shape as illustrated in Figs. 5, 6 and 7, has a flanged periphery 25 and a center boss 26 which registers with the boss 23 in the center of the cog or gear wheel 19, a bore 26a in said boss 26 being exactly in alignment with the bore 23a in the boss 23 of the cog wheel 19.

A pivoting handle 27 is similar to the stationary vertical handle 10 in that it has a rounded top portion 27a and a four-square lower end 28, the end 28 being shouldered at 28a to a flat surface 29 on its rearward face, the second angular plate 30 being secured to the said flat surface 29 by bolts 31 and nuts 32.

The casing 24 is secured to the angular plate 30 by a bolt 33 therethrough, said bolt projecting through a shoulder 28b of the four-square end 28, and secured by a nut 34.

The flange 30a of the angular plate 30 forms a boss 35 having an aperture 36 therethrough, the said flange projecting forwardly from the angular plate 30.

A shim 37 has a pair of ears 38 and 39 projecting upwardly therefrom, said ears having apertures 38a and 39a through the center thereof respectively; a recess 40 spans the rotatable gear or cog 41 where the teeth 41a project beyond the casing 42 and within the slot 24a in the casing 24 of the stationary cog wheel or gear 19 to engage with the teeth 22 thereof.

The casing 42 also has a pair of ears 43 and 44 projecting upwardly therefrom corresponding to the ears 38 and 39 of the shim 37, apertures 38a and 39a in said ears registering with apertures 43a and 44a in the ears 43 and 44.

Bolts 45 through the apertures 38a—43a and 39a—44a serve to secure the casing 42 to the casing 24 by means of nuts 46.

A pivot pin 47 is mounted through apertures 13b and 30b of the angular plates 13 and 30 and through the bores 23a and 26a in the bosses 23 and 26 of the stationary cog wheel 19 and the casing 24 respectively, said pin being secured therein by a nut 48 on the threaded end thereof.

A pivot shaft 49 has a square center portion 50 which is mounted within the square aperture 51 in the rotatable gear 41 the said shaft projecting through the aperture 52 in the cover 53, said cover 53 being secured to the casings 24 and 42 by screws 54. A boss 55 on the lower face of the cover 53 serves as a bearing surface for the rotating collar 56 of the spade mounting 57, and is secured to the shaft 49 by a set screw 58. A spade or blade unit 59 is secured to the flange 57a by bolts 60 therethrough.

In operation, the spade 59 is thrust into the soil 61, and pressed down by foot pressure on the plate 16 mounted on the angular plate 13 of the stationary vertical handle 10; the pivoting handle 27 being pivoted either forward or back on the pin 47 causes the gear 41 to rotate by the engagement of its teeth 41a with the teeth 22 of the stationary cog wheel 19; the rotating of the gear 41 in turn rotates the spade 59 attached by the collar 56 to the shaft 51, and secured in position by the set screw 58.

As the pivoting handle is thrust forward or back, the gear 41, its casing 42 and cover 53 and all parts attached thereto or to which they are attached, move simultaneously in an arc as shown and illustrated by Figs. 2, 3 and 5. The spade penetrates the soil under foot pressure, the thrusting forward or back of the pivot handle 27 causes the spade to revolve and lift the soil or turn it over, the degree being determined by the actual thrust of the handle, the shorter the thrust, the less lift is obtained, while a long thrust will actually eject the soil after lifting it from the trench.

It will be seen that the spade 59 has a compound movement on two axes, one a horizontal axis formed by the pivot 47 and the other a vertical axis formed by the pin 49, both resulting from the swing or movement of the handle 27, the former directly and the latter through the action of the gears. This compound movement very effectively cuts and lifts the soil to be dislodged.

I claim:

1. A digging tool comprising a relatively fixed handle, a movable handle pivoted thereto, a blade pivotally connected to and swinging with the movable handle, and gearing between the fixed handle and the pivot of the blade, constructed to rotate the blade by swinging the movable handle.

2. A digging tool as in claim 1, the gearing including a gear rigid with the fixed handle and another gear meshing with the said gear and mounted on the pivot of the blade.

3. A digging tool comprising a pair of handles pivoted together near the lower ends thereof, a pair of intermeshing gears mounted on the respective handles, one gear being relatively fixed and the other relatively movable, a rotary blade carried by one of the handles, and a pivot connected to the blade and to the movable gear, to rotate the blade by relative movement of the handles.

4. A digging tool comprising a relatively fixed handle, a vertical gear secured thereto, a movable handle having angular casings secured thereto and one of which encloses the face of the vertical gear, a pivot connecting the handles at the center of the said gear, a horizontal gear in the other casing and meshing with the vertical gear, a blade below the last mentioned casing, and a shaft connecting the horizontal gear and the blade.

5. A digging tool as in claim 4, the angular casings having a horizontal cover plate projecting at one side of the tool and enclosing the horizontal gear, and the fixed handle having a foot-piece projecting at the opposite side of the tool.

6. A digging tool comprising a relatively fixed handle, a movable handle pivoted thereto, a blade pivotally carried by and depending from the movable handle, and means operated by swinging the movable handle to produce a compound movement of the blade, on a horizontal axis provided by the pivot of the movable handle and on a vertical axis provided by the pivot of the blade, said means including a vertical gear fixed to the fixed handle, a horizontal gear meshing with said gear and mounted on the pivot of the blade, and angular casings secured to the movable handle and enclosing said gears.

VACLAV F. FLANDERA.